(12) United States Patent
Takashima

(10) Patent No.: US 6,787,941 B2
(45) Date of Patent: Sep. 7, 2004

(54) ACTUATOR FOR DISK DEVICE

(75) Inventor: Tetsuya Takashima, Toyo (JP)

(73) Assignee: Matsushita Electric Industrial Co., Ltd. (JP)

(*) Notice: Subject to any disclaimer, the term of this patent is extended or adjusted under 35 U.S.C. 154(b) by 0 days.

(21) Appl. No.: 10/088,470

(22) PCT Filed: Jul. 17, 2001

(86) PCT No.: PCT/JP01/06196

§ 371 (c)(1),
(2), (4) Date: Aug. 21, 2002

(87) PCT Pub. No.: WO02/07163

PCT Pub. Date: Jan. 24, 2002

(65) Prior Publication Data

US 2003/0030336 A1 Feb. 13, 2003

(30) Foreign Application Priority Data

Jul. 17, 2000 (JP) ........................................ 2000-216325

(51) Int. Cl.[7] .......................... H02K 41/00; G11B 21/08
(52) U.S. Cl. ............................ 310/12; 310/12; 310/15; 360/264.7; 360/265.8
(58) Field of Search .................. 310/12, 15; 360/265.7, 360/264, 265.8

(56) References Cited

U.S. PATENT DOCUMENTS

| 5,122,703 | A | | 6/1992 | Takahashi et al. ............. 310/36 |
| 5,168,185 | A | * | 12/1992 | Umehara et al. .............. 310/15 |
| 5,600,516 | A | * | 2/1997 | Phillips et al. ............ 360/265.1 |
| 5,621,590 | A | * | 4/1997 | Pace et al. ................ 360/244.6 |
| 5,734,528 | A | | 3/1998 | Jabbari et al. ............... 360/106 |
| 6,310,749 | B1 | * | 10/2001 | Beatty et al. ............. 360/265.7 |
| 6,507,459 | B1 | * | 1/2003 | Kamigama ............... 360/245.9 |

FOREIGN PATENT DOCUMENTS

JP 268513 A * 9/2000 ........... G11B/21/02

* cited by examiner

Primary Examiner—Karl Tamai
Assistant Examiner—Yahveh Comas
(74) Attorney, Agent, or Firm—Rossi & Associates

(57) ABSTRACT

In an actuator having a coil disposed between yokes opposing to each other via a specified space, stepped portions are formed at the inner sides of two arms which support the coil, and at the stepped portion are formed through-holes whose diameter is gradually reduced from the bottom to top of the stepped portion. The coil and the arms are joined together by filling the stepped portions and through-holes with a holding member made up of resin. By this configuration, in an actuator used for a disk unit or the like, it is possible to completely secure a coil on a carriage while reducing the unit in thickness.

16 Claims, 10 Drawing Sheets

ACTUATOR FOR DISK DEVICE

TECHNICAL FIELD

The present invention relates to an actuator including a carriage having a head and rocking about a rotary shaft, in a disk unit such as, for example, a magnetic disk unit.

BACKGROUND ART

In a disk unit such as a magnetic disk unit, a carriage provided with a head is required to have excellent dynamic characteristics in order to get access to a target track accurately at a high speed.

FIG. 8 is an exploded perspective view of a conventional actuator for a disk unit or the like. FIG. 9 is a plan view of the carriage of FIG. 8, and FIG. 10 shows the X—X section of FIG. 9.

In FIG. 8, magnets 15 are respectively fixed to upper and lower yokes 9A, 9B. The yokes 9A, 9B are secured by shafts 16 with a specified space there between in a manner such that magnets 15 are opposed to each other in reverse polarity. A coil 7 is fixed on one end of a carriage 8, and on the other end is located a suspension 6 which supports a head 5 for signal recording and reproducing. The carriage 8 is supported by a rotary shaft (not shown) which is set through bearing 36 so that the coil 7 is positioned inside the space and able to rotate about the rotary shaft. That is, when the coil 7 is supplied with a current, a driving force is generated in the coil 7 according to the Fleming's rule, and thereby, the carriage 8 makes a rocking motion.

In a conventional actuator as described above, examples of configuration with the coil 7 fixed on the carriage 8 are shown in FIG. 9 and FIG. 10. In these figures, projection 17 for securing the coil 7 is integrally disposed beforehand at the end of the carriage 8, and the projection 17 and the coil 7 are secured by means of holding member 11 made up of thermoplastic resin.

However, in such conventional configuration, since the coil 7 is supported in a cantilever fashion by the carriage 8, it is not possible to obtain sufficient strength and rigidity for the installation. As a result, the resonance frequency of the carriage 8 becomes lowered and it is unable to satisfy the requirement for higher performance of the disk unit.

FIG. 11 and FIG. 12 are perspective views showing other examples of configuration with respect to the carriage 8 and the coil 7. FIG. 11 is a perspective view before assembly of the carriage 8 and the coil 7. FIG. 12 is a perspective view after assembly of the carriage 8 and the coil 7. In FIG. 12, the portion shaded by black spots is the support member 11 made up of resin. FIG. 13 shows the XIII—XIII section of FIG. 12. FIG. 14 shows the XIV—XIV section of FIG. 12.

In FIG. 11, a long plate-form projection 13 is formed at the inside of coil fitting arm 12A of the carriage 8. Also, there are provided three through-holes 14 at the boundary between the bottom portion of projection 13 and the arm 12A. The configuration of coil fitting arm 12B is same as that of the coil fitting arm 12A. The carriage 8 and the coil 7 are set in a metallic mold (not shown), and the coil 7 is positioned with reference to the carriage 8, and holding member 11 made up of thermoplastic resin is filled therein. Thus, the coil 7 is fixed on the carriage 8. FIG. 12 is a perspective view of the coil 7 fixed on the carriage 8. Like the XIII—XIII section of FIG. 12 shown in FIG. 13, the through-holes 14 are filled with resin of the holding member 11, and therefore, the coil 7 will be free from slipping off from the arms 12A, 12B in the direction of arrow X in FIG. 12. Also, like the XIV—XIV section of FIG. 12 shown in FIG. 14, the projection 13 bites into the holding member 11, and the holding member 11 bites into the depression 7A of winding of the coil 7 as well. Accordingly, the coil 7 is sufficiently held in the direction of arrow Y against the arms 12A, 12B. By such configuration, the portion of fitting the arms 12A, 12B and the coil 7 can be made nearly equal in thickness to the arms 12A, 12B. Since the coil 7 can be disposed between two strong arms 12A and 12B, the resonance frequency will become higher and it is possible to meet the requirement for higher performance of the disk unit.

However, with the recent improvement in performance of disk units, there is an increasing demand for smaller and thinner disk units. To make the disk unit further thinner, it is necessary to reduce the entire actuator less in thickness. For achieving the purpose, it is necessary to make the yokes 9A, 9B, and magnet 15 thinner, and also to reduce the thickness t see FIG. 14) of arms 12A, 12B and coil 7 as much as possible. However, if the thickness t of the arm 12A shown in FIG. 14 is reduced, it will become difficult to form the projection 13 in the center of arm 12A.

DISCLOSURE OF THE INVENTION

The present invention is intended to solve the above problem, providing an actuator wherein the coil may be secured with a sufficient strength against the carriage even in case the coil fitting arm is reduced in thickness.

The actuator of the present invention has the following configuration.

In this configuration, there are provided a pair of yokes opposing to each other via the first specified space, a magnet fixed to at least one of the yokes, and a carriage holding a coil on one end thereof against the magnet via the second specified space and rocking about a rotary shaft; and the carriage comprises two coil fitting arms opposing to each other having stepped portions respectively formed on the opposing surfaces and at least one through-hole, piercing from the bottom to the top of the stepped portion, whose size is larger at the bottom than at the top thereof, the coil disposed between these two coil fitting arms, and a holding member for securing the coil fitting arms, the through-hole and the coil. The holding member is preferable to be formed of a resin-filled block.

By this configuration, since each of the coil fitting arms is provided with a stepped portion, the coil may be securely fixed on the arms even in case the arms are reduced in thickness. Also, there are provided through-holes at the stepped portion of the arm, and the through-hole area is larger at the bottom of the stepped portion than at the top thereof. Also, resin is filled into these through-holes to secure the coil, and the resin will free from slipping off from the holes, and thereby, the coil can be completely fixed on both arms.

DETAILED DESCRIPTION OF PREFERRED EMBODIMENT

The embodiments of the present invention will be described in the following with reference to the drawings.

(First Embodiment)

Figure 1:
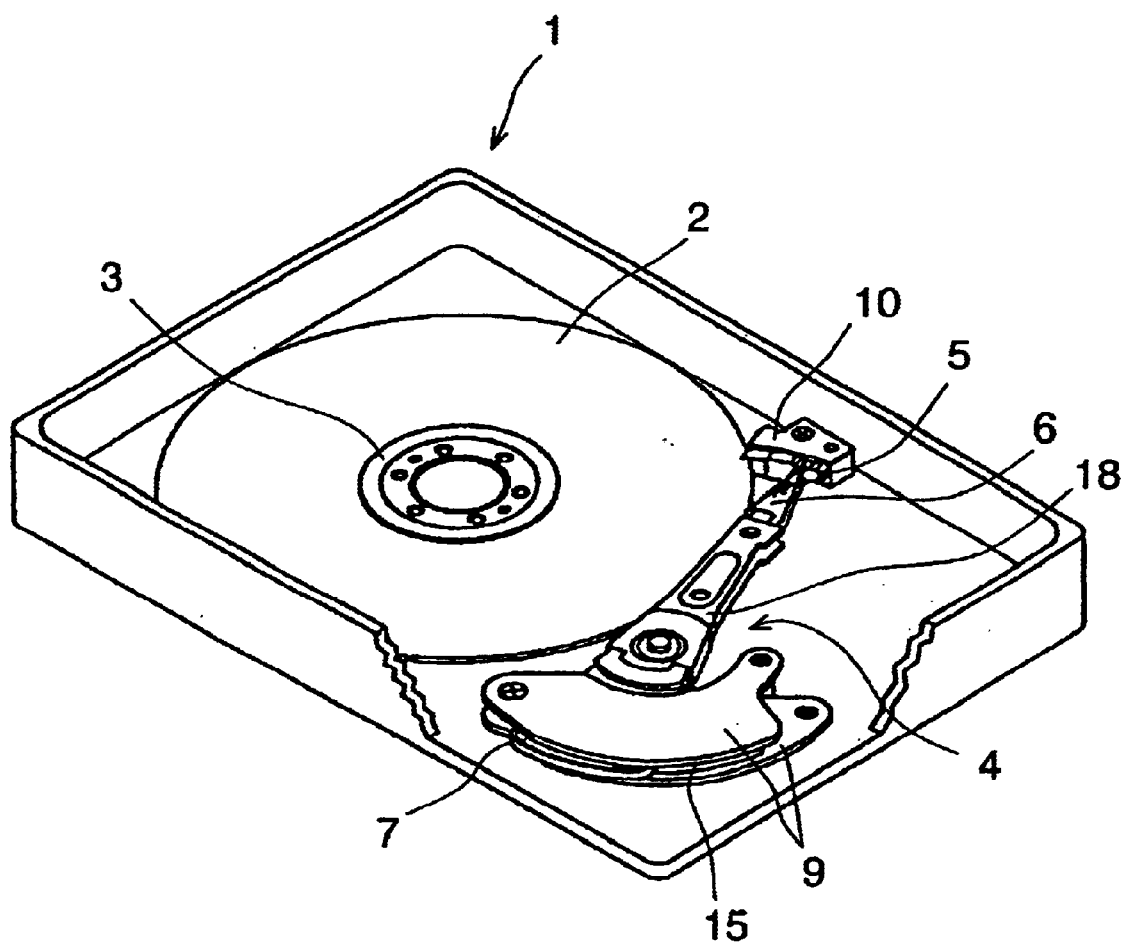
FIG. 1 is a perspective view of a magnetic recording unit equipped with an actuator in a first embodiment of the present invention.
Figure 2:
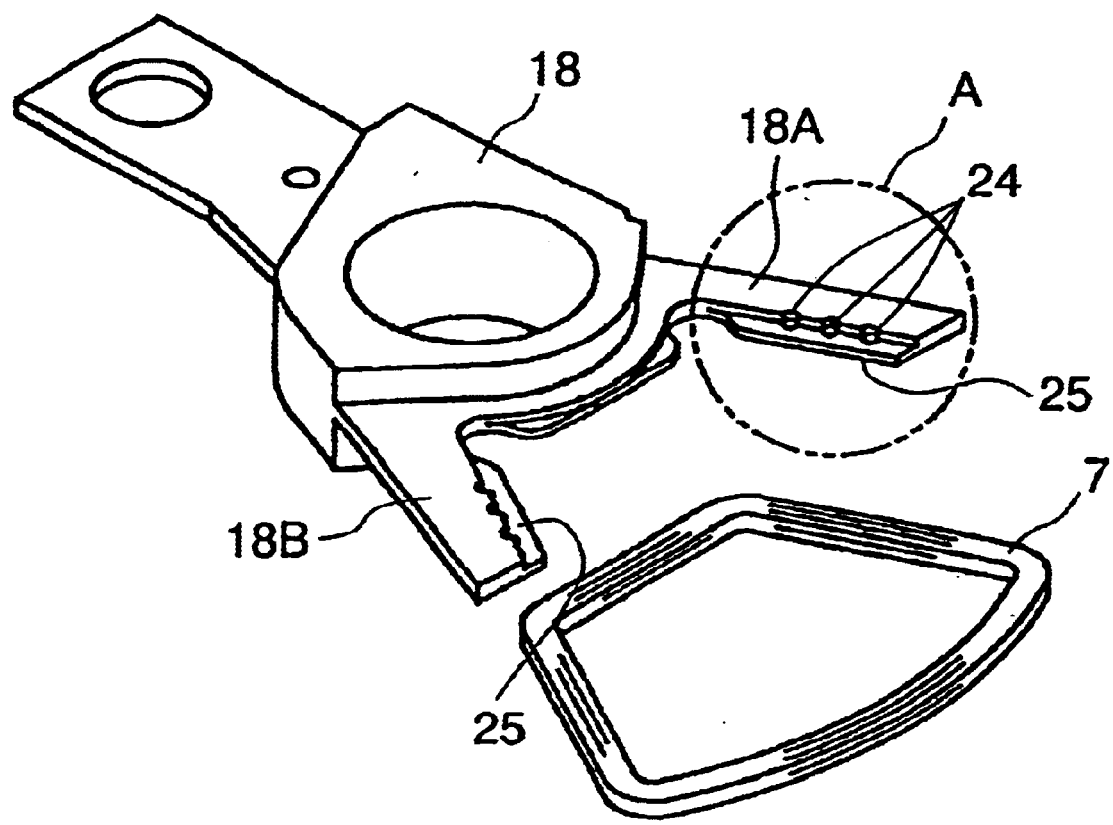
FIG. 2 is a perspective view of a carriage and coil before assembly in the actuator shown in FIG. 1.
Figure 3:
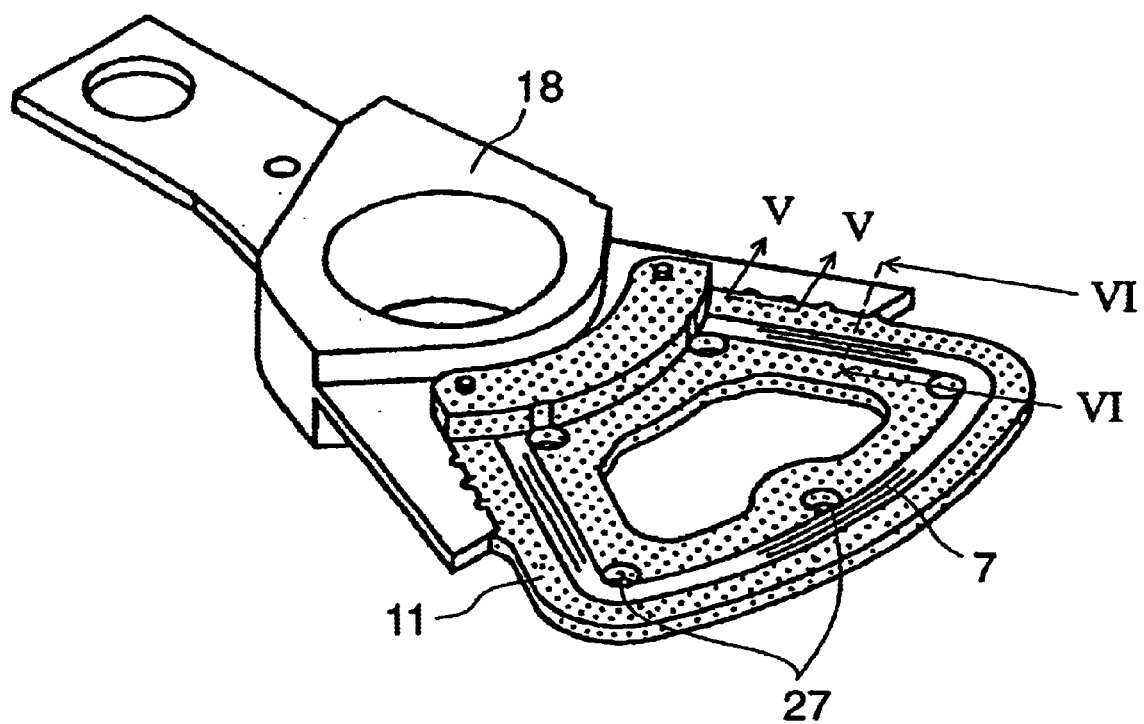
FIG. 3 is a perspective view of the carriage and coil after assembly in the actuator shown in FIG. 1.
Figure 4:
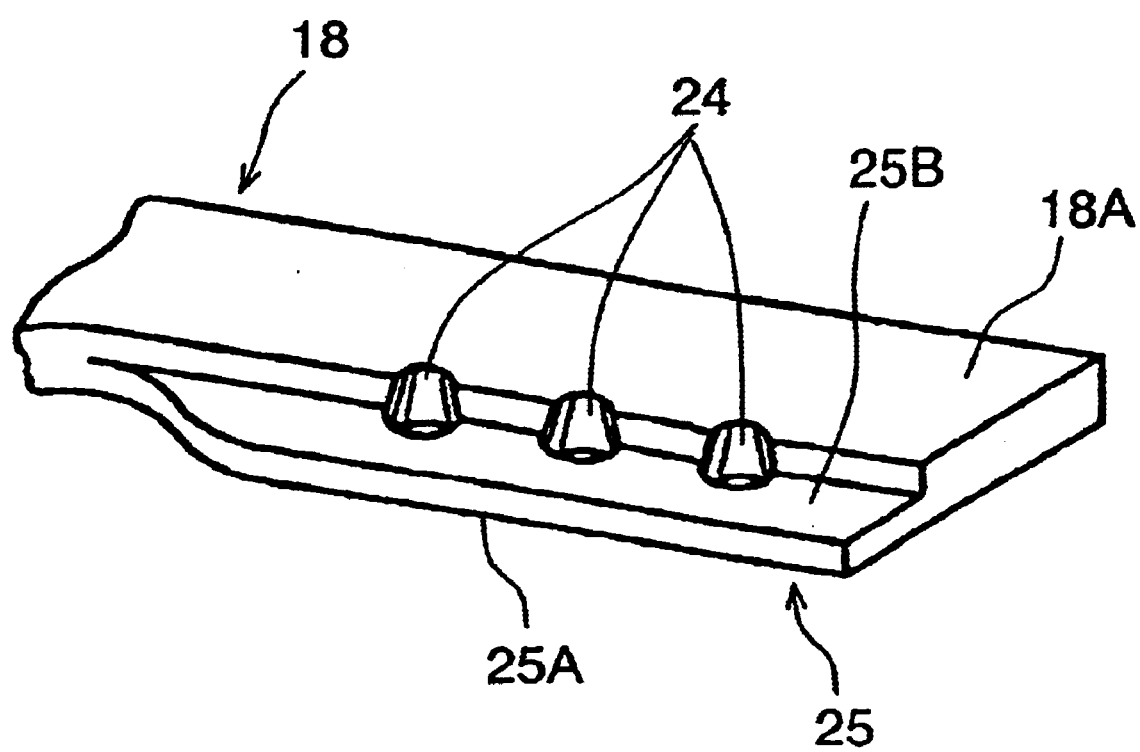
FIG. 4 is an enlarged view of encircled portion A in FIG. 2.
Figure 5:
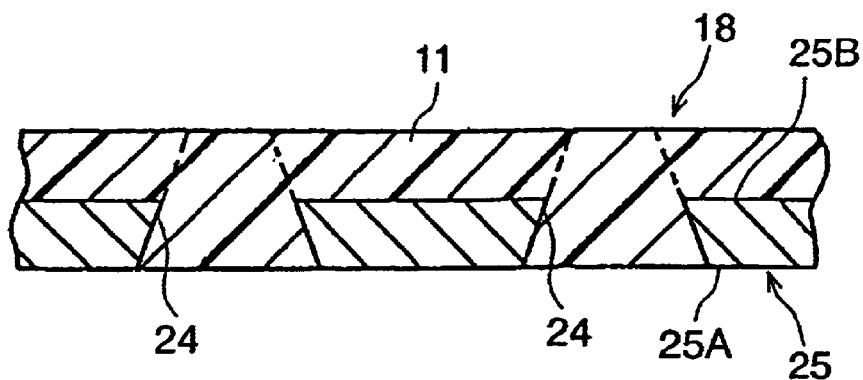
FIG. 5 shows the V—V section of FIG. 3.
Figure 6:
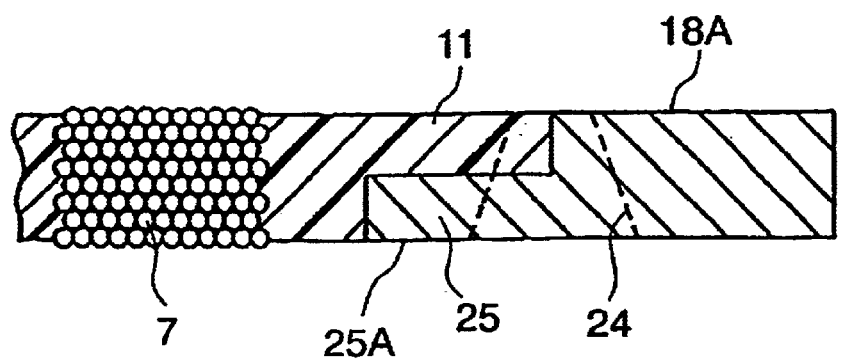
FIG. 6 shows the VI—VI section of FIG. 3.

FIG. 1 is a perspective view of a magnetic recording unit equipped with an actuator in the first embodiment of the present invention. FIG. 2 is a perspective view of a carriage and coil before assembly in the actuator shown in FIG. 1. FIG. 3 is a perspective view of the carriage and coil after assembly. FIG. 4 is an enlarged view of encircled portion A in FIG. 2. FIG. 5 shows the V—V section of FIG. 3. FIG. 6 shows the VI—VI section of FIG. 3.

In FIG. 1, a magnetic disk unit 1 comprises a magnetic disk 2, a disk clamp 3 to hold the magnetic disk 2, a spindle motor (not shown) to rotate the magnetic disk 2, and an actuator 4. The actuator 4 has a coil 7 fixed on one end and a suspension 6 fixed on the other end thereof to support a magnetic head 5. There are provided a carriage 18, a pair of yokes 9 disposed so as to be opposed to each other via the first specified space, and a magnet (permanent magnet) 15 secured on at least one inner surface of the yokes 9. In FIG. 1, when the disk unit is not in operation, the suspension 6 is let to move onto lamp 10, showing that the magnetic head 5 is taking shelter from above the magnetic disk 2.

Next, the assembly of the coil 7 and the carriage 18 in the first embodiment will be described. FIG. 2 is a perspective view before assembly of both parts, and FIG. 3 is a perspective view after assembly thereof. In FIG. 3, the portion shaded by a number of black spots shows holding member 11 made up of thermoplastic resin to be explained in the following.

As shown in FIG. 2, FIG. 4 and FIG. 5, stepped portion 25 is formed at each of the inner sides opposing to each other of coil fitting arms 18A, 18B of the carriage 18. Three through-holes 24 are formed at the bottom of each stepped portion 25. Each of the through-holes 24, as shown in FIG. 5, is shaped so as to be larger in size at the bottom 25A of stepped portion 25 than at the top 25B of same, which is identical with a shape (conical trapezoid) obtained, for example, by removing the top of a cone. The carriage 18 and coil 7 shown in FIG. 2 are put into a metallic mold (not shown), then the coil 7 is positioned with respect to the carriage 18, and after that, thermoplastic resin is filled therein to secure both parts as shown in FIG. 3. That is, the holding member 11 of FIG. 3 is a resin-filled block for securing the arms 18A, 18B, the through-holes 24 and the coil 7. In FIG. 3, five holes 27 located inside the coil 7 are used for insertion of positioning pins disposed in the metallic mold.

Figure 13:
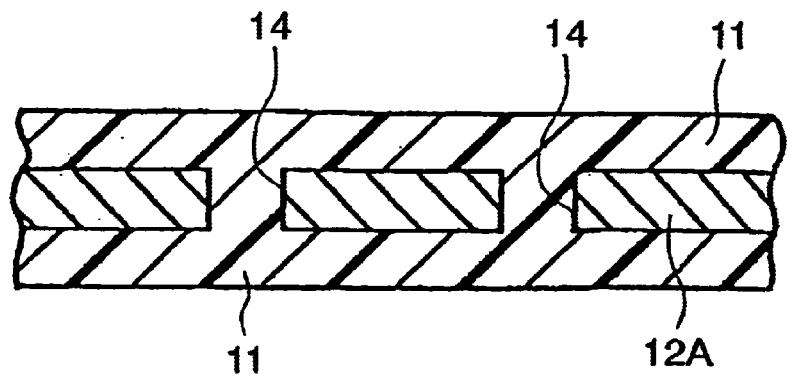
FIG. 13 shows the XIII—XIII section of FIG. 12.
Figure 14:
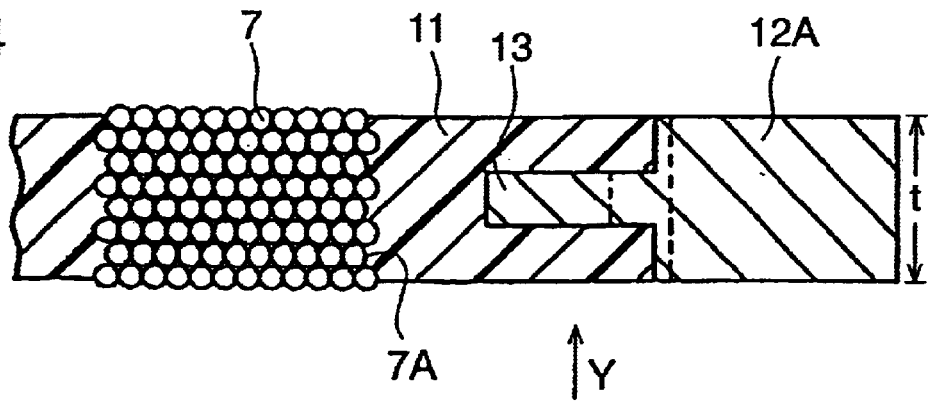
FIG. 14 shows the XIV—XIV section of FIG. 12.

As shown in FIG. 5, since the resin of holding member 11 is filled in the conical trapezoid shaped holes 24, the holding member 11 will be free from slipping off from the arms 18A and 18B. Further, as shown by the VI—VI section of FIG. 3 shown in FIG. 6, the stepped portion 25 of arm 18A is joined to the holding member 11, and also the holding member 11 is biting into the depression of winding of the coil 7 the same as in the conventional configuration. Accordingly, the coil 7 is securely held against the arms 18A, 18B. Also, as is apparent in the comparison between the configuration of a conventional example shown in FIG. 13 and the structure in the first embodiment of the present invention shown in FIG. 5, the reduction in thickness of carriage 18 can be realized in the first embodiment. As for the holding member 11, it is also possible to obtain similar effects by using thermosetting resin or time-lapse setting resin instead of thermoplastic resin.

(Second Embodiment)

Figure 7:
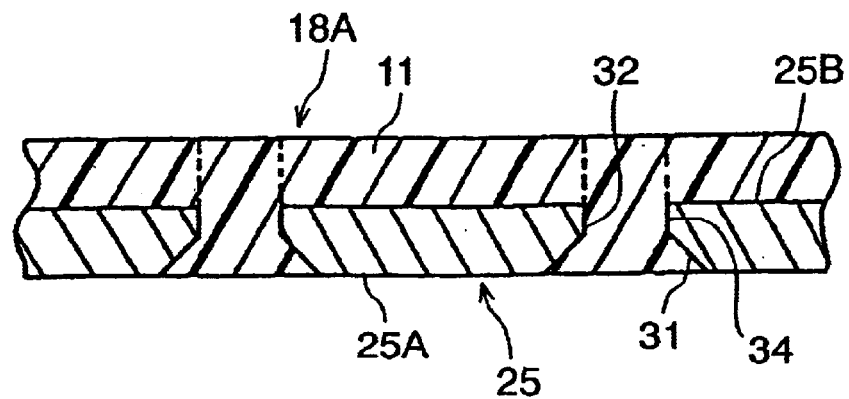
FIG. 7 is a sectional view corresponding to FIG. 5 of the first embodiment in a second embodiment of the present invention.
Figure 8:
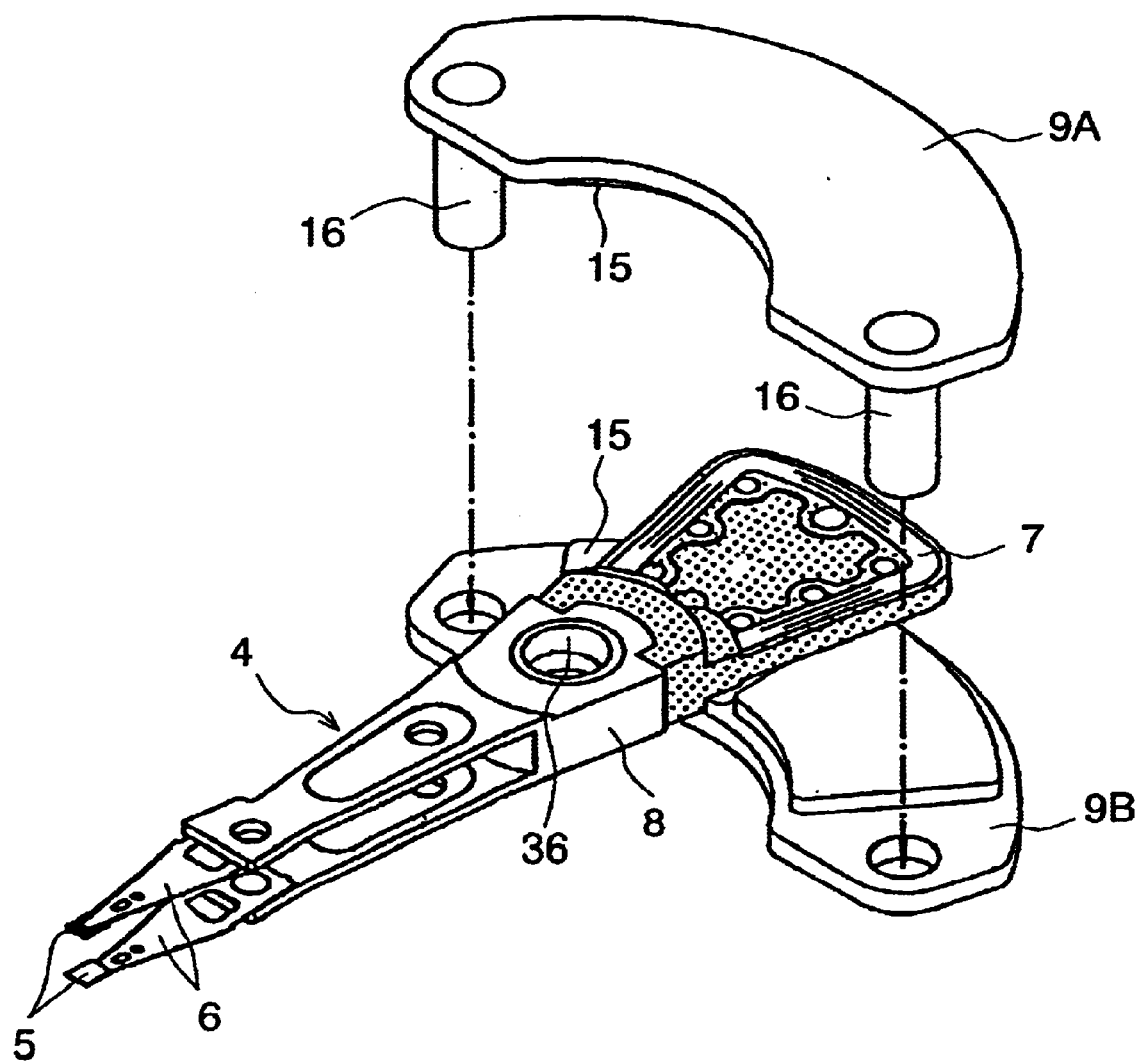
FIG. 8 is an exploded perspective view of a conventional actuator.
Figure 9:
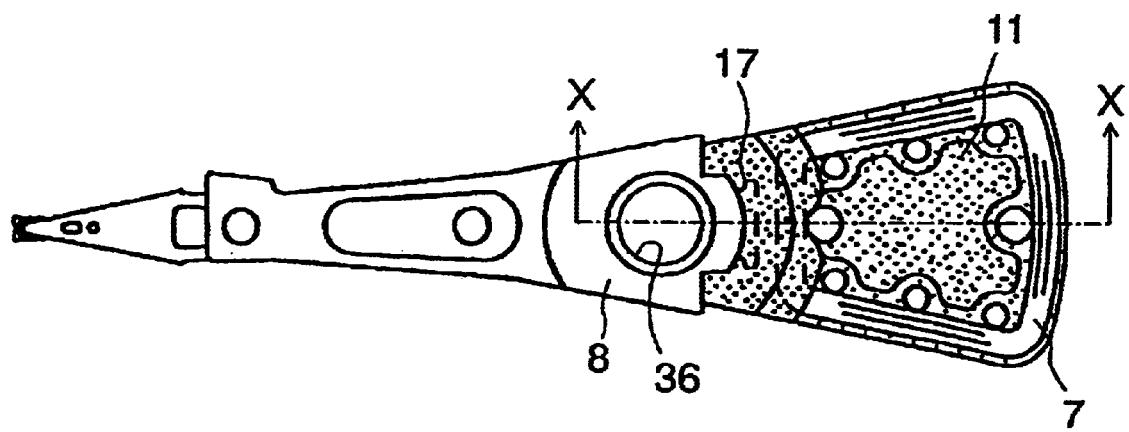
FIG. 9 is a plan view of an essential portion of the actuator shown in FIG. 8.
Figure 10:
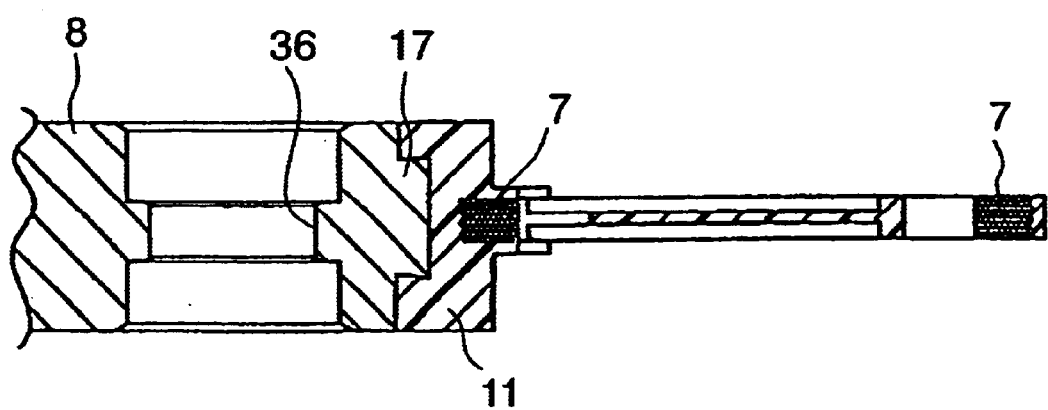
FIG. 10 shows the X—X section of FIG. 9.
Figure 11:
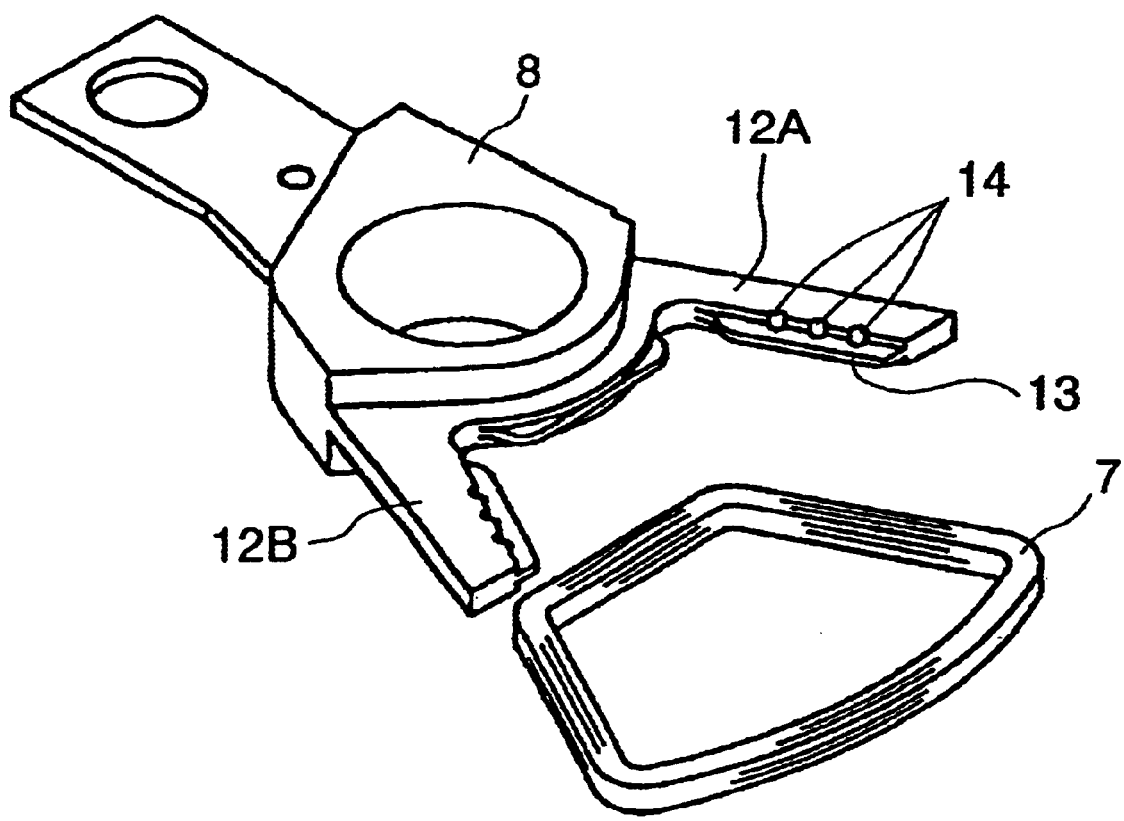
FIG. 11 is a perspective view of an essential portion before assembly in another example of a conventional actuator.
Figure 12:
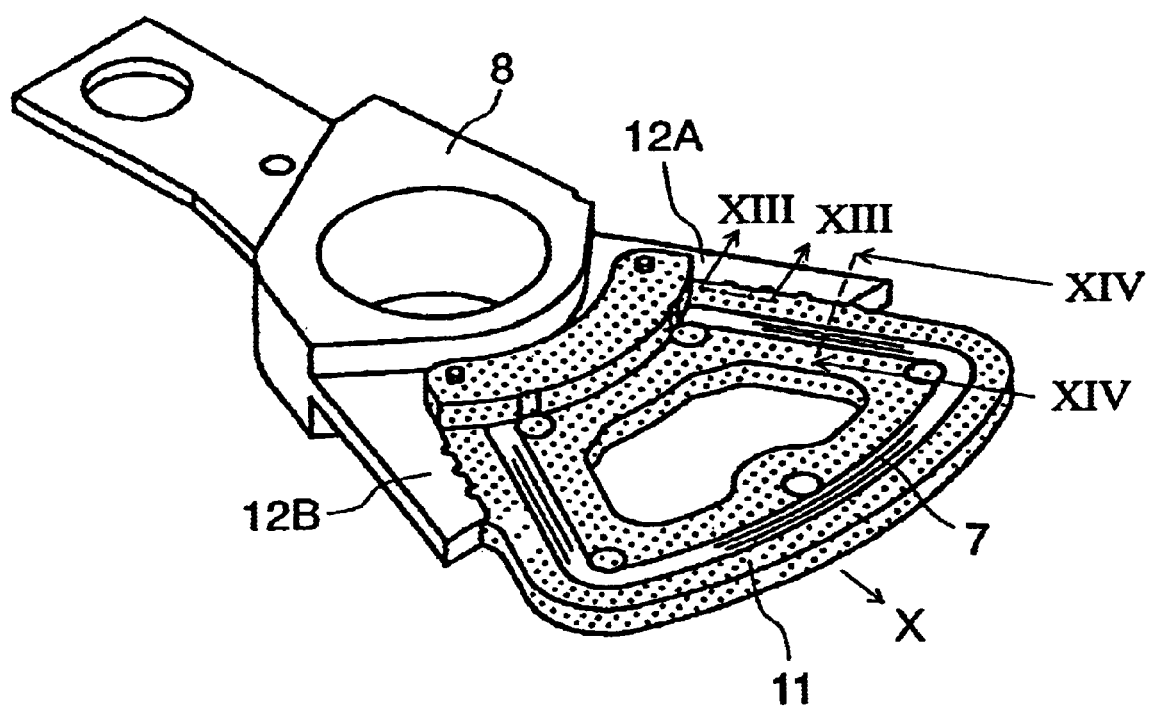
FIG. 12 is a perspective view of the essential portion after assembly in another example of a conventional actuator.

FIG. 7 is a sectional view corresponding to FIG. 5 in the first embodiment in the second embodiment of the present invention. The actuator in the second embodiment is different from the one in the first embodiment only with respect to the shape of through-hole.

That is, in the second embodiment, instead of the through-hole 24 (conical trapezoid) in the first embodiment, there is provided a through-hole whose sectional size parallel to the bottom of the stepped portion is gradually reduced up to a specified point from the bottom and is constant up to the top from the specified point.

That is, as shown in FIG. 7, the shape of hole 31 is of conical trapezoid in the range from the bottom 25A of stepped portion 25 to the middle in the direction of thickness of the stepped portion 25, while the shape of hole 32 is circular and constant in diameter up to the top 25B. In this case, the strength will be further improved because portion 34 around the hole 32 at the stepped portion 25 is increased in thickness.

As described above for each of the embodiments, the present invention is able to provide an actuator which is less in thickness and capable of assuring that the coil is securely fixed on the coil fitting arms without fear of removal of the coil in the direction vertical to the surfaces including the coil fitting arms even in case of using coil fitting arms reduced in thickness.

INDUSTRIAL APPLICABILITY

The present invention is an actuator for a disk unit such as a magnetic disk unit, which can meet the requirements for excellent performance and thickness reduction. In a rocking actuator having a coil disposed between a pair of yokes opposing to each other via a specified space, stepped portions are formed at the inner sides of two arms which support the coil, and at the stepped portions are formed through-holes whose diameter is gradually reduced from the bottom to the top of the stepped portion. The coil may be completely secured on the arms by filling the stepped portions and through-holes with holding member resin. By using this configuration, it is possible to provide an actuator which is reduced in thickness and assures excellent strength.

What is claimed is:

1. An actuator comprising:

a pair of yokes opposing each other, a magnet fixed to at least one of said yokes, a carriage pivotable about a rotary shaft, a coil, and a holding member made of resin and securing said coil, wherein said carriage includes a pair of spaced apart coil fitting arms opposing each other, each of said arms having a stepped portion, the stepped portions of said coil fitting arms facing each other, and each of said coil fitting arms having at least one through-hole extending through the respective stepped portion and to the top of the respective coil fitting arm, said through-hole being sized larger at the bottom than at the top of said stepped portion, wherein said holding member is disposed between said coil fitting arms, and extends into each through-hole to secure said holding member to said carriage, wherein the holding member is configured so that the bottom of the stepped portion is substantially flush with the bottom of the holding member, and wherein said stepped portion is formed at each inner side of a pair of coil fitting arms that support said coil, and said stepped portion and each through-hole are filled with the resin forming said holding member.

2. The actuator of claim 1, wherein said holding member is formed of a resin-filled block.

3. The actuator of claim 1, wherein said stepped portions are respectively formed on the same sides of said coil fitting arms.

4. The actuator of claim 1, wherein the sectional size parallel to the bottom of said through-hole is gradually reduced from the bottom toward the top.

5. The actuator of claim 1, wherein the sectional area parallel to the bottom of said through-hole is gradually reduced the bottom toward the top.

6. The actuator of claim 1, wherein the sectional size parallel to the bottom of said through-hole is gradually reduced up to a specified point from the bottom and is constant from the specified point up to the top.

7. The actuator of claim 1, wherein the sectional area parallel to the bottom of said through-hole is gradually reduced up to a specified point from the bottom and is constant from the specified point up to the top.

8. The actuator of claim 1, wherein said through-hole is formed at a boundary portion between said coil fitting arm and said stepped portion.

9. The actuator of claim 2, wherein the resin is thermoplastic resin.

10. The actuator of claim 2, wherein the resin is thermosetting resin.

11. The actuator of claim 2, wherein the resin is time-lapse setting resin.

12. The actuator of claim 1, wherein the holding member also has an opposing pair of stepped portions that are complementary to the stepped portions of the coil fitting arms.

13. An actuator comprising:

a pair of yokes opposing each other, a magnet fixed to at least one of said yokes, a carriage pivotable about a rotary shaft, a coil, and a holding member formed of a resin-filled block securing said coil, wherein said carriage includes a pair of spaced apart coil fitting arms opposing each other, each of said arms having a stepped portion, the stepped portions of said coil fitting arms facing each other and are formed on the same sides of said coil fitting arms, and each of said coil fitting arms having a plurality of through-holes, said through-hole being sized larger at the bottom than at the top of said stepped portion, wherein said holding member is disposed between said coil fitting arms, and extends into each through-hole to secure said holding member to said carriage, wherein the holding member is configured so that the bottom of the stepped portion is substantially flush with the bottom the holding member, wherein said through-holes extend through said stepped portions and to the top of said coil fitting arms, wherein a sectional area parallel to the bottom of the through-holes is gradually reduced from the bottom of the through-hole to a specified point and is constant up to the top of the through holes from the stepped point, and wherein said stepped portion is formed at each inner side of a pair of coil fitting arms that support said coil, and said stepped portion each through-hole are filled with the resin forming said holding member.

14. The actuator of claim 13, wherein the holding member also has an opposing pair of stepped portions that are complementary to the stepped portions of the coil fitting arms.

15. The actuator of claim 1, wherein positioning the bottom of said holding member flush with the bottom of said stepped portion allows said coil fitting arms to be thinner.

16. The actuator of claim 13, wherein positioning the bottom of said holding member flush with the bottom of said stepped portion allows said coil fitting arms to be thinner.

* * * * *